US007327874B2

(12) United States Patent
Shibaki et al.

(10) Patent No.: US 7,327,874 B2
(45) Date of Patent: Feb. 5, 2008

(54) METHOD OF AND APPARATUS FOR IMAGE PROCESSING APPARATUS, AND COMPUTER PRODUCT

(75) Inventors: Hiroyuki Shibaki, Tokyo (JP); Noriko Miyagi, Tokyo (JP); Hirokazu Takenaka, Tokyo (JP); Satoshi Ouchi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 918 days.

(21) Appl. No.: 10/665,463

(22) Filed: Sep. 22, 2003

(65) Prior Publication Data

US 2004/0114815 A1 Jun. 17, 2004

(30) Foreign Application Priority Data

Sep. 20, 2002 (JP) ............................. 2002-274837

(51) Int. Cl.
*G06K 9/00* (2006.01)
(52) U.S. Cl. ...................... 382/162; 382/166; 382/199; 382/252
(58) Field of Classification Search ................ 382/162, 382/166, 167, 199, 252, 266
See application file for complete search history.

(56) References Cited

U.S. PATENT DOCUMENTS

| 5,204,665 | A | * | 4/1993 | Bollman et al. ............ 345/605 |
| 5,384,646 | A | * | 1/1995 | Godshalk et al. ........... 358/448 |
| 5,418,899 | A |   | 5/1995 | Aoki et al. |
| 5,464,200 | A |   | 11/1995 | Nakazato et al. |
| 5,708,949 | A |   | 1/1998 | Kasahara et al. |
| 5,797,074 | A |   | 8/1998 | Kasahara et al. |
| 5,825,937 | A |   | 10/1998 | Ohuchi et al. |
| 5,850,298 | A |   | 12/1998 | Narahara et al. |
| 5,911,004 | A |   | 6/1999 | Ohuchi et al. |
| 5,960,246 | A |   | 9/1999 | Kasahara et al. |
| 6,259,813 | B1 |   | 7/2001 | Ouchi |
| 6,480,623 | B1 |   | 11/2002 | Yagishita et al. |

(Continued)

FOREIGN PATENT DOCUMENTS

JP 6-326859 11/1994

(Continued)

OTHER PUBLICATIONS

S. Ohuchi, et al., IEICE Transactions D-II, vol. J75- D-II, No. 1, pp. 39-47, "Segmentation Method for Documents Containing Text/Picture (Screened Halftone, Continuous Tone)", Jan. 1992 (with English translation).

*Primary Examiner*—Phuoc Tran
(74) *Attorney, Agent, or Firm*—Oblon, Spivak, McClelland, Maier & Neustadt, P.C.

(57) ABSTRACT

An image processing apparatus includes a first calculating unit that calculates a first feature amount from a color image signal, a first processing unit that processes the color image signal based on the first feature amount to generate a processed signal, a compressing unit that compresses the processed signal to generate a compressed signal, a storage unit that stores the compressed signal, a decompressing unit that decompresses the compressed signal to generate a decompressed signal, a second calculating unit that calculates a second feature amount from the decompressed signal, and a second processing unit that processes the decompressed signal based on the second feature amount. The second feature amount is multinary.

15 Claims, 13 Drawing Sheets

U.S. PATENT DOCUMENTS

| | | |
|---|---|---|
| 6,556,707 B1 | 4/2003 | Yagishita et al. |
| 6,977,757 B1 | 12/2005 | Takahashi et al. |
| 7,142,330 B2 | 11/2006 | Takahashi et al. |
| 2004/0114815 A1 | 6/2004 | Shibaki et al. |
| 2006/0187246 A1 | 8/2006 | Miyagi |
| 2006/0192878 A1 | 8/2006 | Miyahara et al. |

FOREIGN PATENT DOCUMENTS

| | | |
|---|---|---|
| JP | 9-186866 | 7/1997 |
| JP | 2677283 | 11/1997 |
| JP | 2001-128004 | 5/2001 |
| JP | 2002-152537 | 5/2002 |

* cited by examiner

FIG. 3A

| -1 | -1 | -1 | 0 | 1 | 1 | 1 |
|---|---|---|---|---|---|---|
| -1 | -1 | -1 | 0 | 1 | 1 | 1 |
| -1 | -1 | -1 | 0 | 1 | 1 | 1 |
| -1 | -1 | -1 | 0 | 1 | 1 | 1 |
| -1 | -1 | -1 | 0 | 1 | 1 | 1 |
| -1 | -1 | -1 | 0 | 1 | 1 | 1 |
| -1 | -1 | -1 | 0 | 1 | 1 | 1 |

FIG. 3B

| -1 | -1 | -1 | -1 | -1 | -1 | -1 |
|---|---|---|---|---|---|---|
| -1 | -1 | -1 | -1 | -1 | -1 | -1 |
| -1 | -1 | -1 | -1 | -1 | -1 | -1 |
| 0 | 0 | 0 | 0 | 0 | 0 | 0 |
| 1 | 1 | 1 | 1 | 1 | 1 | 1 |
| 1 | 1 | 1 | 1 | 1 | 1 | 1 |
| 1 | 1 | 1 | 1 | 1 | 1 | 1 |

FIG. 3C

| 0 | 1 | 1 | 1 | 1 | 1 | 1 |
|---|---|---|---|---|---|---|
| -1 | 0 | 1 | 1 | 1 | 1 | 1 |
| -1 | -1 | 0 | 1 | 1 | 1 | 1 |
| -1 | -1 | 0 | 0 | 1 | 1 | 1 |
| -1 | -1 | -1 | -1 | 0 | 1 | 1 |
| -1 | -1 | -1 | -1 | -1 | 0 | 1 |
| -1 | -1 | -1 | -1 | -1 | -1 | 0 |

FIG. 3D

| 1 | 1 | 1 | 1 | 1 | 1 | 0 |
|---|---|---|---|---|---|---|
| 1 | 1 | 1 | 1 | 1 | 0 | -1 |
| 1 | 1 | 1 | 1 | 0 | -1 | -1 |
| 1 | 1 | 1 | 0 | -1 | -1 | -1 |
| 1 | 1 | 0 | -1 | -1 | -1 | -1 |
| 1 | 0 | -1 | -1 | -1 | -1 | -1 |
| 0 | -1 | -1 | -1 | -1 | -1 | -1 |

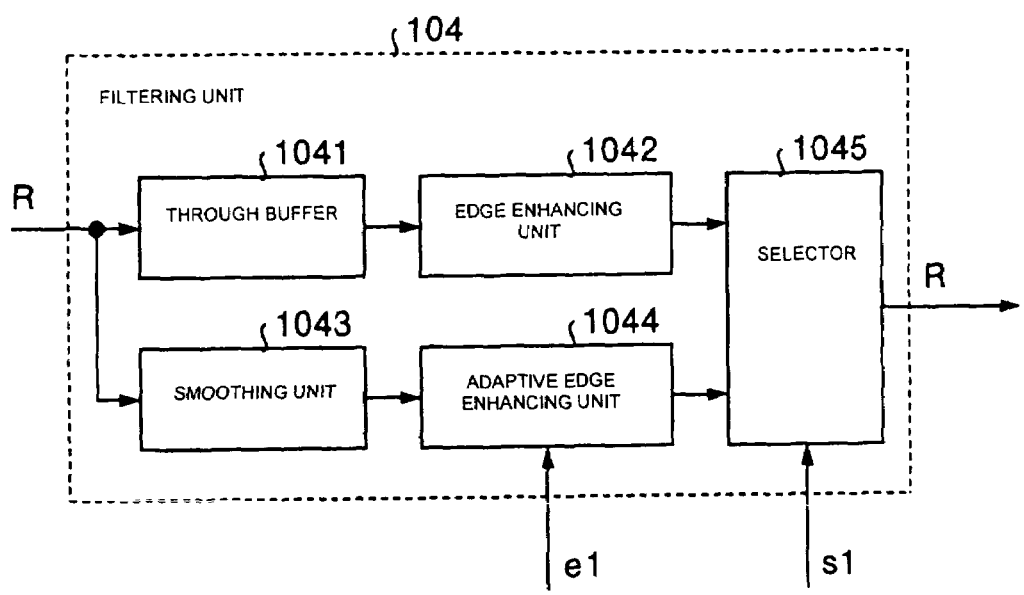

FIG. 7
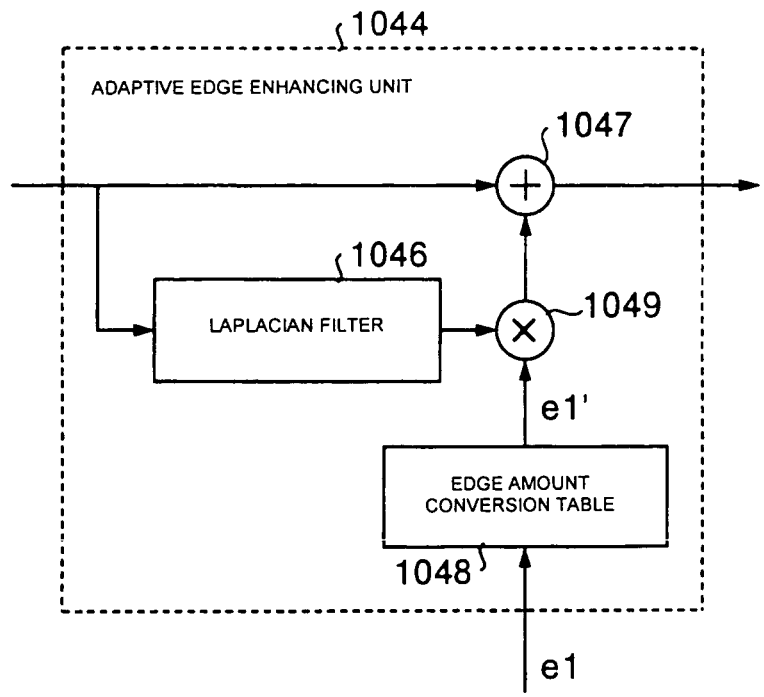
FIG. 8
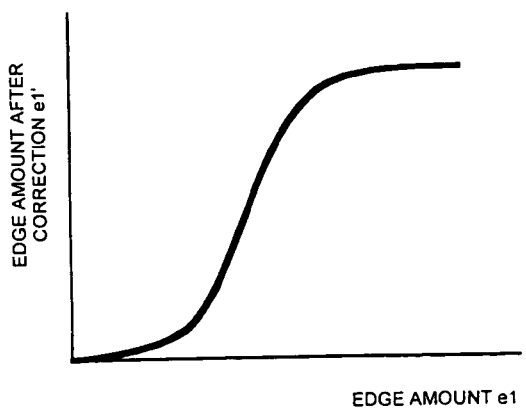
FIG. 9

METHOD OF AND APPARATUS FOR IMAGE PROCESSING APPARATUS, AND COMPUTER PRODUCT

BACKGROUND OF THE INVENTION

1) Field of the Invention

The present invention relates to an image processing apparatus that compresses an input image signal to be stored in a memory, reads out the stored image signal at a predetermined timing, decompresses the signal, and outputs the signal to a recording unit.

2) Description of the Related Art

An image processing apparatus such as a digital color copier obtains a color image by superposing plates of four color as black (K), cyan (C), magenta (G), and yellow (Y) on one another and printing the plates. In this case, images need to be stored temporarily in a memory in order to control timings of printing the color plates, which causes a required memory capacity to be enormous. To prevent the increase in the memory capacity, a method of compressing image data and storing the data in the memory, has been employed. Further, users have requests to not only output a captured image but also store the image as digital data and even use the data on a personal computer. In this case also, the image data needs to be compressed to an appropriate data amount. In either of the cases, compressing data at a certain stage during image processing is getting common in digital color copiers.

Furthermore, to improve image quality, processes as follows are carried out. That is, an image area is separated from each pixel area in data for a captured image, and it is determined whether the image area is a character area or a halftone area such as a photographic image. Area data indicating if the image area is the character area or the halftone area is generated for each pixel, and the area is subjected to image processing according to the area data. More specifically, the processing is switched between processes of filtering and halftoning according to the pixel area.

A conventional image processing apparatus is disclosed, for example, in Japanese Patent Application Laid Open No. HEI 9-186866. This image processing apparatus includes a first image area separating unit that separates a binary image area comprised of a character and a line from a halftone image area such as a photograph and a halftone dot print, in an input image signal, and generates an image signal. The image processing apparatus further includes a second image area separating unit that subjects the image signal to first image processing based on the separation data, compresses and stores the processed image signal, decompresses the stored image data to generate an image signal, and determines if there is an edge in the decompressed image signal. The second image area separating unit then determines one area as an area with an edge ("edge area") and another area as an area without an edge ("non-edge area"), and subjects the data to second image processing based on the result of determination.

That is, in the image processing apparatus, the second image area separating unit determines the presence or absence of the edge in the compressed and decompressed image signal, and subjects the two image areas, the edge area and the non-edge area, to different types of processing (switching of the halftone processing between the numbers of lines such as a 200-line screen and a 400-line screen). It is, thereby, thought possible that the sharpness of a character portion is compatible with the tone and granularity of a halftone image portion such as a photograph and printed photograph. Furthermore, the image data before being compressed and decompressed is divided into the character area and the photograph area by the first image area separating unit, and both of the areas are subjected to the processing for an appropriate spatial frequency during the first image processing. In the second image area separating unit, high separation capability can be obtained because the areas have wider latitude for determination.

However, it is seen in many cases that an actual dot image (photographic print image) has an area with a large edge amount. Like the image processing apparatus, even if an enhancing filter is used for the character area and a smoothing filter is used for the dot image in the first image processing, the dot image with a screen having a small number of lines is often subjected to insufficient smoothing, and therefore the second image area separating unit may determine that the image has an edge. Further, the image processing apparatus binarily determines the presence or absence of an edge according to an edge determination threshold. Therefore, some dot-line images inevitably obtain a problem such that the image has an edge area and a non-edge area at the same time.

Therefore, if a dot image is subjected to strong smoothing filtering, setting may be possible so as to determine that a dot image with any number of lines has no edge. However, if such a strong smoothing filtering is subjected, the character on the dots is also subjected to the strong smoothing processing, and therefore the character becomes a blurred image with no sharpness therein, which is not practical. A smoothing filter or a band pass filter is generally used so as to leave the sharpness of characters to some extent. Alternatively, an adaptive edge filter is used so as to control the intensity of the filter based on an edge amount. As explained above, such filter characteristics result in coexistence such that the edge area and the non-edge area coexist in the dot image. Therefore, a reproduced image does not seem natural because the 200-line screen and the 400-line screen coexist in the same image.

Particularly, determination through the second image area separation as to whether the edge exists is performed on the image data after being subjected to irreversible compression and decompression. Therefore, the determination becomes unstable because of influence of image deformation due to the processing of compression and decompression. Thus, coexistence of the different determination results is made more significant in the dot image. Because of this, when adaptive image processing is selected based on the determination, as to whether the edge exists, that is performed on the image data having been irreversibly compressed and decompressed, a defect (poor and inferior image quality due to the coexistence) occurs in an area where the determination results coexist.

SUMMARY OF THE INVENTION

It is an object of this invention to solve at least the problems in the conventional technology.

The image processing apparatus according to one aspect of the present invention includes a first calculating unit that calculates a first feature amount from a color image signal; a first processing unit that processes the color image signal based on the first feature amount to generate a processed signal; a compressing unit that compresses the processed signal to generate a compressed signal; a storage unit that stores the compressed signal; a decompressing unit that decompresses the compressed signal to generate a decompressed signal; a second calculating unit that calculates a second feature amount from the decompressed signal, wherein the second feature amount being multinary; and a second processing unit that processes the decompressed signal based on the second feature amount.

The image processing method according to another aspect of the present invention includes calculating a first feature amount from a color image signal; processing the color image signal based on the first feature amount to generate a processed signal; compressing the processed signal to generate a compressed signal; decompressing the compressed signal to generate a decompressed signal; calculating a second feature amount that is multinary from the decompressed signal; and processing the decompressed signal based on the second feature amount.

The computer program according to still another aspect of the present invention causes a computer to execute the method according to the present invention.

The other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 3A to FIG. 3D illustrate primary differential filters of an edge amount detecting filter of FIG. 2;

FIG. 4 is a block diagram of the detailed configuration of a filtering unit of FIG. 1;

FIG. 5 illustrates a Laplacian filter;

FIG. 6 illustrates a smoothing filter;

FIG. 7 illustrates the detailed configuration of an adaptive edge enhancing unit;

FIG. 8 illustrates output characteristics of an edge amount conversion table of FIG. 7;

FIG. 9 illustrates another Laplacian filter;

DETAILED DESCRIPTION

Exemplary embodiments of a method, an apparatus and a computer product according to the present invention will be explained in detail below with reference to the accompanying drawings.

Figure 1:
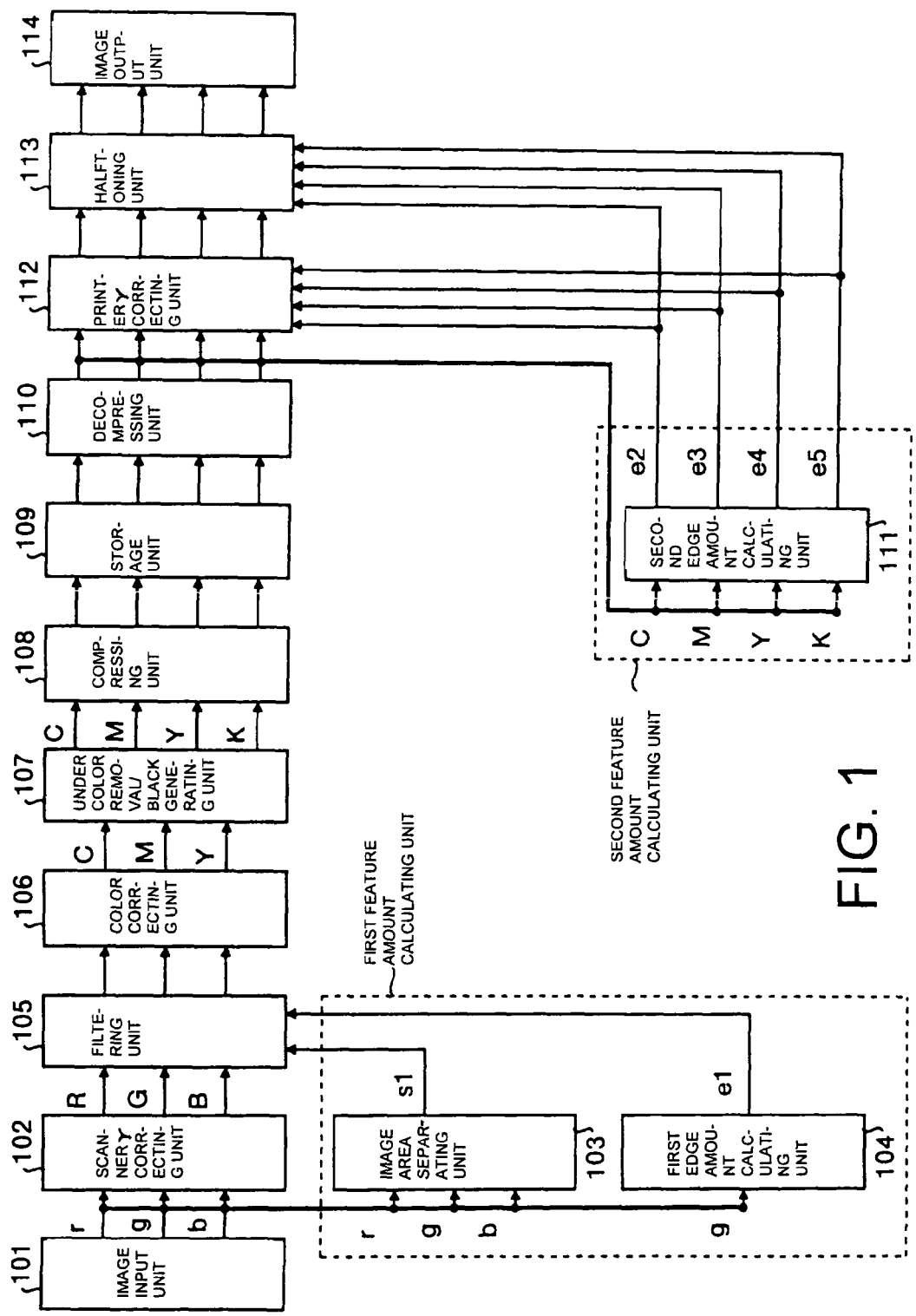
FIG. 1 is a block diagram of an image processing apparatus according to a first embodiment of the present invention.

An image processing apparatus according to a first embodiment of the present invention will be explained below with reference to FIG. 1 to FIG. 9. FIG. 1 is a block diagram of the image processing apparatus according to the first embodiment. The image processing apparatus includes an image input unit 101, a scanner γ correcting unit 102, an image area separating unit 103, a first edge amount calculating unit 104, a filtering unit 105, a color correcting unit 106, an undercolor removal/black generating unit 107, a compressing unit 108, a storage unit 109, a decompressing unit 110, a second edge amount calculating unit 111, a printer γ correcting unit 112, a halftoning unit 113, and an image output unit 114. The image area separating unit 103 and the first edge amount calculating unit 104 form a first feature amount calculating unit, and the second edge amount calculating unit 111 forms a second feature amount calculating unit.

The image input unit 101 is formed with, for example, a scanner, optically reads a color document, converts data for the document into a 8-bit digital image signal for each of red, green, and blue (rgb) colors, and outputs the rgb signals to the scanner γ correcting unit 102 and the image area separating unit 103, and also outputs the g signal to the first edge amount calculating unit 104.

The scanner γ correcting unit 102 converts the input rgb signals each with a linear reflectivity into red, green, and blue (RGB) signals each with a linear density using a lookup table (LUT), and outputs the RGB signals to the filtering unit 105.

The image area separating unit 103 receives the rgb signals from the image input unit 101, discriminates a character area from an image area other than that in the rgb signals by units of pixel (or units of block), and outputs an area signal s1 to the filtering unit 105. The image area other than that mentioned here represents a dot image area (character on dots is discriminated from the dot image area), a continuous tone image area, and a ground area.

The first edge amount calculating unit 104 receives the g signal from the image input unit 101, calculates a level of edge of the g signal by units of pixel (units of block) as an edge amount e1, and outputs the edge amount e1 to the filtering unit 105.

The filtering unit 105 subjects the RGB signals input from the scanner γ correcting unit 102 to adaptive edge enhancement processing or smoothing processing based on the area signal s1 and the edge amount e1, and outputs the signals to the color correcting unit 106.

The color correcting unit 106 converts the RGB signals input from the filtering unit 105 into cyan, magenta, and yellow (CMY) signals that are suitable for color materials for a printer through a masking arithmetic or the like, and outputs the CMY signals to the undercolor removal/black generating unit 107.

The undercolor removal/black generating unit 107 subjects the input CMY signals to color removal/black generation processing and converts the signals to cyan, magenta, yellow, and black (CMYK) signals, and outputs the signals to the compressing unit 108.

The compressing unit 108 compresses each of the input CMYK signals based on a predetermined irreversible compression method, and stores the compressed CMYK signals in the storage unit 109.

The storage unit 109 includes a dynamic random access memory (DRAM) and a hard disk, and stores the CMYK signals compressed in the compressing unit 108.

The decompressing unit 110 reads out the compressed CMYK signals stored in the storage unit 109, decompresses the signals, and outputs the decompressed signals to the printer γ correcting unit 112 and the second edge amount calculating unit 111.

The second edge amount calculating unit 111 calculates edge amounts e2 to e5 of the input CMYK signals by units of pixel (or units of block) using a predetermined edge amount calculating filter for each of the CMYK signals, and outputs the calculated edge amounts e2 to e5 to the printer γ correcting unit 112 and the halftoning unit 113.

The printer γ correcting unit 112 converts the CMYK signals input from the decompressing unit 110 into linear signals for the output characteristics of the image output unit 114 based on the edge amounts e2 to e5 input from the second edge amount calculating unit 111, and outputs the signals to the halftoning unit 113. The printer γ correcting unit 112 is controlled according to process contents in the halftoning unit 113, and corrects a difference in tone characteristics due to the contents of the halftone processing to obtain reproduction of uniform density.

The halftoning unit 113 subjects the CMYK signals input from the printer γ correcting unit 112 to adaptive dither processing based on the edge amounts e2 to e5 input from the second edge amount calculating unit 111 so that the sharpness of a character image is compatible with the tone and granularity of a dot image and a continuous tone image, and outputs the signals to the image output unit 114.

The image output unit 114 is formed with, for example, a laser printer, and prints an image according to the CMYK signals input from the halftoning unit 113 on a recording medium such as a recording paper.

The image area separating unit 103, first edge amount calculating unit 104, filtering unit 105, color correcting unit 106, and the undercolor removal/black generating unit 107 are explained in detail below.

The image area separating unit 103 performs known image area separation processing. Various methods of the image area separation processing have been disclosed. One of examples that can be used is "Image Area Separation System of Image Including Character and Pattern (dots, photograph)" IEICE Transactions Vol. 75-D-II No. 1 pp. 39-47, January 1992. In this image area separation system, the image area separation is totally determined based on two results of detections as an edge area detection and a dot area detection. More specifically, a character on a blank background is determined as a character area, and a dot image including a character on dots and a continuous tone image are determined as a pattern area (area other than the character). The detailed operation of the image area separating unit 103 is described in the paper, and the explanation thereof will be omitted here.

Figure 2:
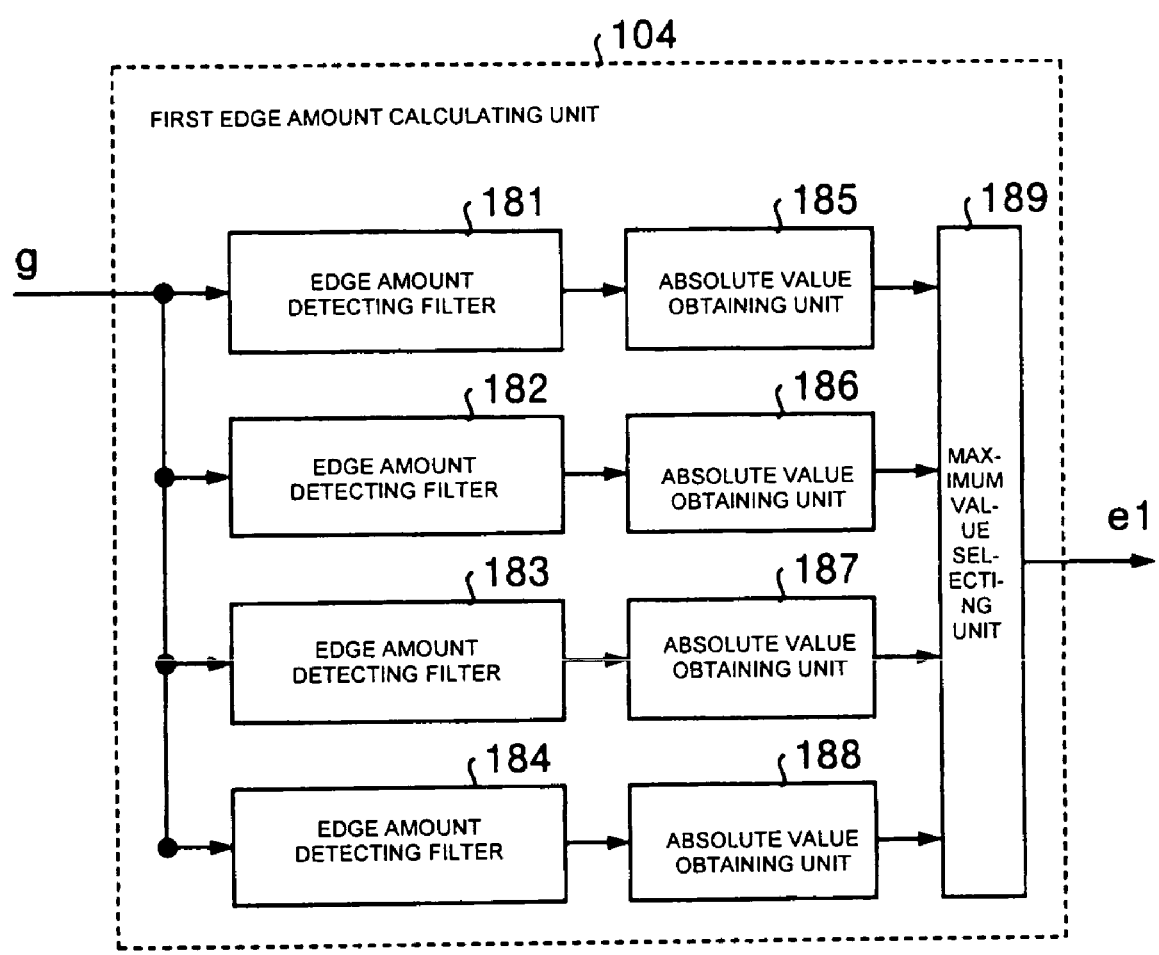
FIG. 2 is a block diagram of a detailed configuration of an edge amount calculating unit of FIG. 1.

The first edge amount calculating unit 104 calculates continuous (multilevel) edge amounts of the g signal input from the image input unit 101 by units of pixel (or units of block), and outputs the edge amount to the filtering unit 105. FIG. 2 is a block diagram of the detailed configuration of the first edge amount calculating unit 104. The first edge amount calculating unit 104 includes edge amount detecting filters 181 to 184, absolute value obtaining units 185 to 188, and a maximum value selecting unit 189.

Each of the edge amount detecting filters 181 to 184 includes primary differential filters each of a 7×7 matrix size as shown in FIG. 3A to FIG. 3D, and detects an edge in a vertical direction, an edge in a horizontal direction, an edge in a leftward slanting direction, and an edge in a rightward slanting direction, respectively. The edge amount detecting filters 181 to 184 subject the g signal input from the image input unit 101 to primary differential filtering, and output the results of the calculations to the absolute value obtaining units 185 to 188.

The absolute value obtaining units 185 to 188 obtain absolute values from the calculation results input from the edge amount detecting filters 181 to 184, and output the values to the maximum value selecting unit 189.

The maximum value selecting unit 189 selects the maximum value from among the four absolute values input from the absolute value obtaining units 185 to 188, and outputs the value as an edge amount signal e1 to the filtering unit 105.

The example using the primary differential filter is shown here, but a secondary differential filter may be used. In the secondary differential filter, a high edge amount is calculated at a central part of a line, which is sometimes advantageous for the edge enhancement processing. The primary differential filter and the secondary differential filter may be combined or the matrix size may be changed according to a purpose.

The filtering unit 105 subjects the RGB signals input from the scanner γ correcting unit 102 to conversion on spatial frequency characteristics based on the area signal s1 (character/pattern) input from the image area separating unit 103 and the edge amount signal e1 input from the first edge amount calculating unit 104 for each of RGB, and outputs the signals to the color correcting unit 106. The block where the R signal of the RGB signals is processed will be explained here. FIG. 4 is a block diagram of the detailed configuration of the filtering unit 105 of FIG. 1, and illustrates the processing of the R signal in particular of the RGB signals. The blocks for processing the G signal and the B signal have the same configuration as that of the R signal, and therefore explanation of the blocks is omitted.

The filtering unit 105 includes a through buffer 1041, an edge enhancing unit 1042, a smoothing unit 1043, an adaptive edge enhancing unit 1044, and a selector 1045.

As shown in FIG. 4, an upper path including the through buffer 1041 and the edge enhancing unit 1042 is a system of processing a character area, and a lower path including the smoothing unit 1043 and the adaptive edge enhancing unit 1044 is a system of processing a pattern area. The R signal output from the scanner γ correcting unit 102 is input into the through buffer 1041 and the smoothing unit 1043.

The through buffer 1041 temporarily stores the input R signal, and outputs the signal to the edge enhancing unit 1042. The edge enhancing unit 1042 subjects the input R signal to uniform edge enhancement processing by the edge enhancing filter, and outputs the signal to the selector 1045. FIG. 5 illustrates an example of a filtering coefficient of the edge enhancing filter, which is designed to emphasize the sharpness of a character.

The smoothing unit 1043 subjects the R signal input from the scanner γ correcting unit 102 to smoothing by the smoothing filter, and outputs the signal to the adaptive edge enhancing unit 1044. FIG. 6 illustrates another example of the filtering coefficient of the edge enhancing filter.

The adaptive edge enhancing unit 1044 subjects the R signal input from the smoothing unit 1043 to adaptive edge enhancement processing based on the edge amount e1 input from the first edge amount calculating unit 104, and outputs the signal to the selector 1045.

FIG. 7 illustrates the detailed configuration of the adaptive edge enhancing unit 1044 of FIG. 4. The adaptive edge enhancing unit 1044 includes a Laplacian filter 1046, an adder 1047, a unit for an edge amount conversion table 1048 ("edge amount conversion table 1048"), and a multiplier 1049.

The edge amount conversion table 1048 converts the edge amount signal e1 input from the first edge amount calculating unit 104 to an edge amount e1' and outputs the signal to the multiplier 1049. FIG. 8 illustrates output characteristics of the edge amount conversion table 1048. The edge amount conversion table 1048 has a characteristic such that a corrected edge amount e1' becomes a further smaller value in an area where an input edge amount e1 is small. Therefore, weak edge enhancement is applied to the area where the edge amount e1 of a dot photographic area and a background dot portion of a character is comparatively small, by correcting the amount so that the edge amount e1' is further smaller. On the other hand, the edge amount conversion table 1048 has a characteristic such that the edge amount e1' after correction becomes considerably large in an area where the input edge amount e1 is comparatively large. Therefore, strong edge enhancement is applied to the area where the edge amount of the character in the dot image is comparatively large, by correcting the amount so that the edge amount e1' is further larger.

The Laplacian filter 1046 and the adder 1047 are input with the R signal having being subjected to the process of smoothing from the smoothing unit 1043. The Laplacian filter 1046 is used for extracting a Laplacian component from the R signal after the smoothing through the process of filtering using a Laplacian filter as shown in FIG. 9 to output the component to the multiplier 1049. The multiplier 1049 multiplies the input Laplacian component by the corrected edge amount e1' input from the edge amount conversion table 1048 to obtain a product, and outputs the product to the adder 1047. The adder 1047 adds the R signal after the smoothing to the output of the adder 1047 and outputs the added value to the selector 1045.

The selector 1045 selects either one of the R signal input from the edge enhancing unit 1042 and the R signal input from the adaptive edge enhancing unit 1044 based on the area signal s1 input from the image area separating unit 103, and outputs the selected signal to the color correcting unit 106. Accordingly, the dot portion is not enhanced but the edge enhancement is subjected to the character on dots, thus the processing is performed so as to allow both the granularity of the pattern portion and the sharpness of the character to be obtained at the same time.

The color correcting unit 106 converts the RGB signals input from the filtering unit 105 into CMY signals that are suitable for color materials for a printer system through a masking arithmetic, and outputs the CMY signals to the undercolor removal/black generating unit 107. The following equation (1) represents an example of the masking arithmetic:

$$C = \alpha 11 \times R + \alpha 12 \times G + \alpha 13 \times B + \beta 1$$

$$M = \alpha 21 \times R + \alpha 22 \times G + \alpha 23 \times B + \beta 2$$

$$Y = \alpha 31 \times R + \alpha 32 \times G + \alpha 33 \times B + \beta 3 \qquad (1)$$

Where α11 to α33 and β1 to β3 are preset color correcting coefficients, and CMY to be output are 8-bit (0 to 255) signals.

The undercolor removal/black generating unit 107 generates a K signal as a black component based on the CMY signals input from the color correcting unit 106, performs undercolor removal (UCR) on the CMY signals, and outputs the CMYK signals to the compressing unit 108. The generation of the K signal and the removal of the undercolor from the CMY signals are performed through arithmetic processing by the following equation (2).

$$K = \mathrm{Min}(C, M, Y) \times \beta 4$$

$$C' = C - K \times \beta 5$$

$$M' = M - K \times \beta 5$$

$$Y' = Y - K \times \beta 5 \qquad (2)$$

Where Min (C, M, Y) represents a minimum of the CMY signals, and β4 and β5 are preset coefficients and 8-bit signals.

The compressing unit 108 compresses the CMYK signals input from the undercolor removal/black generating unit 107, and stores the signals in the storage unit 109. The decompressing unit 110 decompresses again the CMYK signals temporarily stored in the storage unit 109, and outputs the signals to the printer γ correcting unit 112 and the second edge amount calculating unit 111.

When copying of a plurality of sheets is requested from a user through an operating section, the compressed CMYK signals stored in the storage unit 109 are read out a plurality of times corresponding to a number of sheets to be copied, and are subjected to subsequent image processing to be output. The compressing unit 108 uses the irreversible compression method. That is because in an apparatus having an electronic sorting function, image data for a large number of sheets needs to be stored in a storage unit, and therefore the data needs to be compressed at a high compression rate. Further, a storage unit such as a hard disk that is comparatively inexpensive is generally used because a RAM to be used as the storage unit 109 is expensive. However, a high image transferring speed is important, and therefore the compression rate is required to be as high as possible.

As explained above, by using the irreversible compression method, the decompressed image signal is distorted in terms of image quality, which affects a subsequent process as edge amount calculation in the second edge amount calculating unit 111. This matter will be explained in detail later.

The second edge amount calculating unit 111 calculates again continuous (multilevel) edge amounts e2 to e5 of the CMYK signals input from the decompressing unit 110 by units of pixel (or units of block) for each color, and outputs the edge amounts to the printer γ correcting unit 112 and the halftoning unit 113. The method of calculating the edge amounts e2 to e5 is the same as that in the first edge amount calculating unit 104. The first edge amount calculating unit 104 calculates the edge amount of the g signal, but the second edge amount calculating unit 111 calculates continuous edge amounts of each of the C, M, Y, K signals.

The printer γ correcting unit 112 and the halftoning unit 113 continuously control the characteristics and the processing according to the edge amounts e2 to e5 input from the second edge amount calculating unit 111 to realize reproduction of a high quality image. As an adaptive dither processing based on the edge amounts, for example, the method disclosed in "Image processing device" in Japanese Patent Application Laid Open (JP-A) No. HEI 6-326859 can be used. In the publication, the method includes previously storing a plurality of basic dither tables, referring to a predetermined dither table based on an input edge amount, and calculating a dither threshold through an interpolation arithmetic based on the referred dither table and the edge amount. In such a configuration, it is possible to continuously determine dither thresholds with respect to the edge amounts obtained as a continuous amount.

Another example of the configuration of the halftoning unit 113 is disclosed in "Image processing method, image processing apparatus, and storage medium" in JP-A No 2001-128004, and the technology disclosed therein can be used. In the publication, the method includes forming quantized thresholds for error diffusion processing to a dither pattern, and controlling the magnitude of the dither amplitude based on an edge amount. More specifically, a large-amplitude dither threshold is applied to a pattern portion with a small edge amount, and a small-amplitude dither threshold or a threshold with an amplitude of zero is applied to a character edge portion with a large edge amount. Thereby, both the sharpness of the character and granularity of the pattern portion are obtained at the same time. Furthermore, the publication discloses the method of multiplying a dither amplitude as a base by a magnification obtained based on the edge amount, and controlling a level of the amplitude.

The edge amounts e2 to e5 calculated in the second edge amount calculating unit 111 is input into the halftoning unit 113 that continuously controls the edge amounts based on the edge amount obtained in the above manner. The halftoning unit 113 subjects the edge amounts to the process of halftoning to allow a high quality image without a defect to be reproduced.

The printer γ correcting unit 112 is controlled following the control performed on the halftoning unit 113, and corrects tone characteristics (raw γ characteristic of printer) due to a different halftone processing method so as to obtain uniform output density characteristic. The correction characteristic of the printer γ correcting unit 112 may be the same as that of the method of determining a dither threshold disclosed in JP-A No. HEI 6-326859. That is, the method may include previously storing a plurality of printer γ tables as a base, referring to a predetermined printer γ table based on an input edge amount, performing an interpolation arithmetic based on the referred printer γ table and the edge amount, and determining correction characteristic. In such a configuration, it is possible to continuously determine the printer γ correction characteristic with respect to the edge amounts obtained as a continuous amount.

As explained above, the image processing apparatus does not store the area signal s1 generated in the image area separating unit 103 and the edge amount e1 generated in the first edge amount calculating unit 104, that is, does not store feature amounts of an image in the storage unit 109. This is because the need for storing the feature amounts of the image such as the area signal s1 and the edge amount e1 in the storage unit 109 is eliminated and the storage capacity is reduced, thus being effective in simplification of the system.

The image processing apparatus that does not include a storage unit for image feature amounts needs to generate anew image feature amounts in order to perform processing in the rear stage of the compression. The image processing apparatus shown in FIG. 1 requires the image feature amounts to control the printer γ correcting unit 112 and the halftoning unit 113. This is because the sharpness of the character and the granularity of the pattern portion are allowed to be compatible with each other.

However, in the conventional image processing apparatus (JP-A No. HEI 9-186866), a unit for obtaining feature amounts in the rear stage is provided to binarily determine if the edge exists, and therefore image has been degraded in the area where the both results of the determination coexist. Specifically, there has been a tendency that the coexistence is seen in a dot portion with a comparatively small number of lines such as about 100 lines. If very strong smoothing is subjected to the dot image portion, the area indicating the coexistence can be brought into the area with the small number of lines. However, as a certain level of sharpness is actually required for the character image on dots, the smoothing cannot be performed so strongly. In order to perform smoothing on the background dot image while sharpness of the character on the dots is improved, the filtering unit 105 is configured to subject a non-character area (pattern area) to the adaptive edge enhancement after the smoothing is processed. However, since the edge amount detected in the dot portion with about 100 lines is approximate to the edge amount detected in the character portion on the dots, insufficient smoothing is generally performed. Consequently, both the edge area and the non-edge area coexist in the dot area with a small number of lines, which results in degradation of image quality.

Particularly, when the feature amount is extracted from the image signal processed by the irreversible compressing and decompressing units, a feature amount cannot be uniformly extracted, which causes significant image degradation. To solve the problem, as explained in the first embodiment, the edge amount extracted in the rear stage of the compression is set as a continuous value, and the processing in the image processing unit (printer γ correcting unit 112 and halftoning unit 113) controlled based on the edge amounts is continuously preformed. Thus, the defect (poor image) due to coexistence of both determination results is suppressed.

As explained above, in the first embodiment, the dither thresholds are continuously controlled based on the continuous edge amounts, and at the same time the characteristic of the printer γ correction is continuously controlled. Thereby, the defect due to switching of the halftone processing is suppressed.

Since the error diffusion processing using the dither amplitude thresholds is employed as the halftone processing, the tone characteristic in the thresholds applied to the character is comparatively similar to the tone characteristic in the thresholds applied to the pattern. Thus, it is possible to obtain an image with a less density difference, the density difference being caused by switching the processing. Further, the amplitude of dither is controlled but the number of lines of dither is not controlled, which is effective as the processing with which the defect due to the switching is inconspicuous.

When the image processing apparatus is thus configured, a high quality image can be reproduced in the image processing apparatus that extracts feature amounts of an image from an image signal after compression and decompression are performed, without using feature amounts of the image in the previous stage.

In the first embodiment, a unit (second edge amount calculating unit 111) for calculating an edge amount is shown as the feature amount calculating unit provided in the rear stage of the compression, but a unit for calculating a feature amount of an image is not limited to this. For example, a unit for extracting a dot density in the dot image and a unit for extracting a proportion of chromatic pixels or achromatic pixels may be employed. If feature amounts are extracted from the signal after compression and decompression, then multilevel continuous amount may be used.

Figure 10:
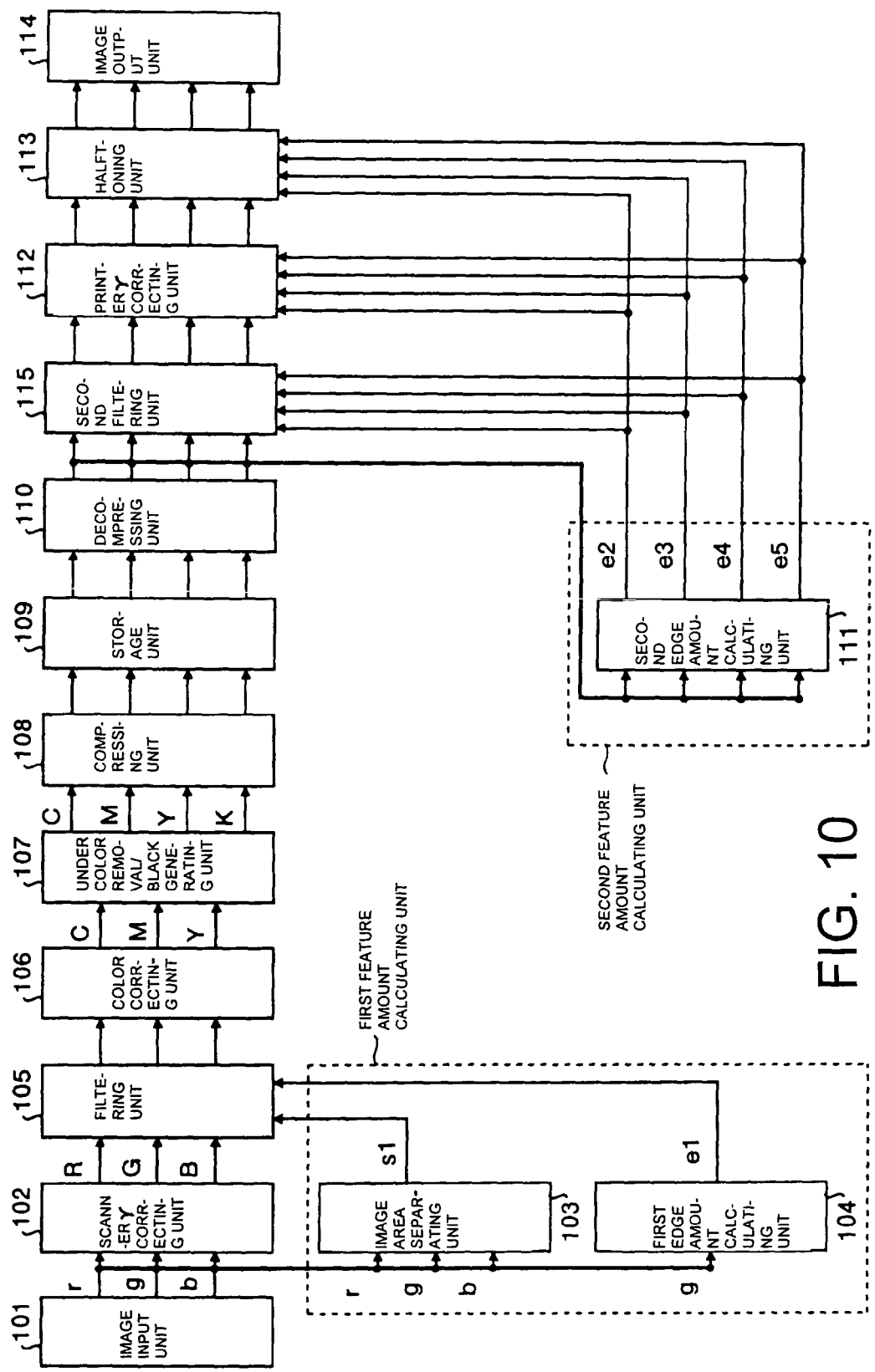
FIG. 10 is a block diagram of an image processing apparatus according to a second embodiment of the present invention.

FIG. 10 is a block diagram of the image processing apparatus according to a second embodiment of the present invention. In FIG. 10, the same reference numerals are assigned to units having the equivalent functions to those of the units in FIG. 1. The image processing apparatus of the second embodiment has a second filtering unit 115 between the decompressing unit 110 and the printer γ correcting unit 112 based on the configuration of the first embodiment (FIG. 1), and controls the second filtering unit 115 using the edge amounts e2 to e5 generated in the second edge amount calculating unit 111. According to the second embodiment, it is possible to cope with the case where the user wants only the sharpness of a character portion to be slightly stronger or the case where the user wants the sharpness of a character portion to be slightly weaker during copying, and reproduce a high quality image. The units arranged in the previous stage from the second filtering unit 115 perform the same processing as that of FIG. 1, and explanation thereof is omitted.

The second edge amount calculating unit 111 calculates edge amounts e2 to e5 by units of pixel (or units of block) for each color of the CMYK signals in the same manner as the first embodiment, and outputs the amounts to the second filtering unit 115, printer γ correcting unit 112, and the halftoning unit 113.

The second filtering unit 115 has the same configuration as that of the adaptive edge enhancing unit 1044 shown in FIG. 7. The second filtering unit 115 corrects the edge amounts e2 to e5 of the CMYK signals input from the decompressing unit 110 according to required image adjustment using the edge amount conversion table, and outputs the corrected amounts.

Figure 11:
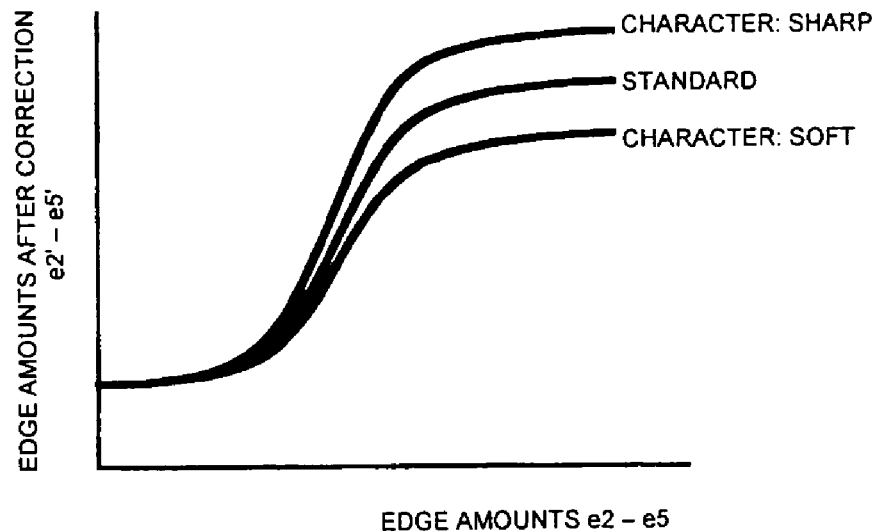
FIG. 11 illustrates output characteristics of an edge amount conversion table.
Figure 12:
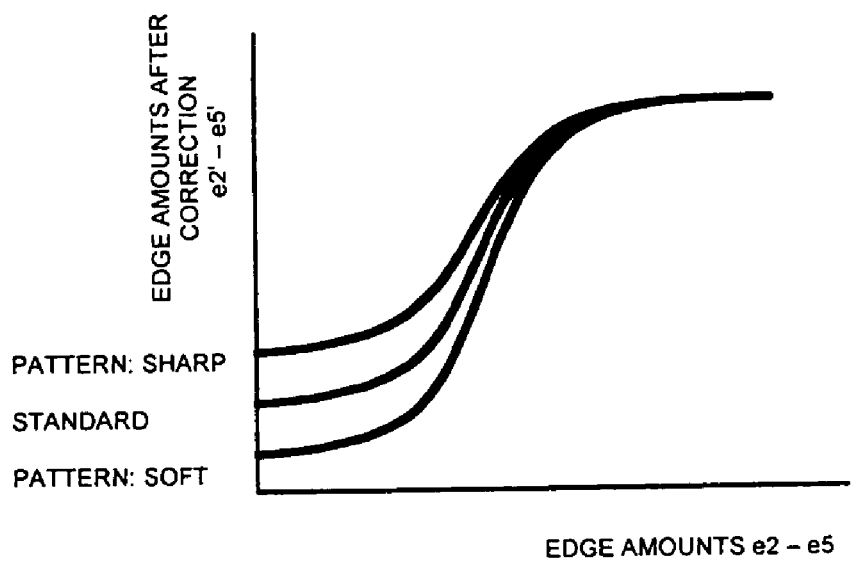
FIG. 12 illustrates another output characteristics of an edge amount conversion table.

More specifically, the character portion is adjusted using the edge amount conversion table as shown in FIG. 11. If the character is made sharper in edge as compared with a standard level, an area with a large edge amount is converted to a larger amount of data than the standard and is output. Conversely, if the character is made softer in edge, an area with a larger edge amount is converted to a smaller amount of data than the standard and is output. On the other hand, the pattern portion is adjusted by using an edge amount conversion table shown in FIG. 12. If the pattern portion is made sharper, an area with a small edge amount is converted to a larger amount of data than the standard and is output. By performing the control in such a manner as explained above, sharpness can be finely adjusted.

In the image processing apparatus according to the present invention, the compressed and stored data is repeatedly read out to perform copying in a plurality of sheets. Therefore, the filtering unit is required to be provided on the downstream of the compressing unit. Furthermore, in order to control the sharpness of the character portion and the pattern portion individually, the edge amount calculating unit as shown in the second embodiment is required. If the edge amount is to be obtained from the compressed and decompressed image signal in the same manner as the first embodiment, the process of adaptive edge enhancement cannot be performed smoothly based on binary determination on presence or absence of an edge, which results in obtaining an image that does not seem natural in a way due to coexistence of a binary difference between filtering strengths.

On the other hand, in the second embodiment, the edge amounts generated in the second edge amount calculating unit 111 are determined as a continuous amount, and filtering is performed continuously. Thus, a high quality image can be reproduced.

Figure 13:
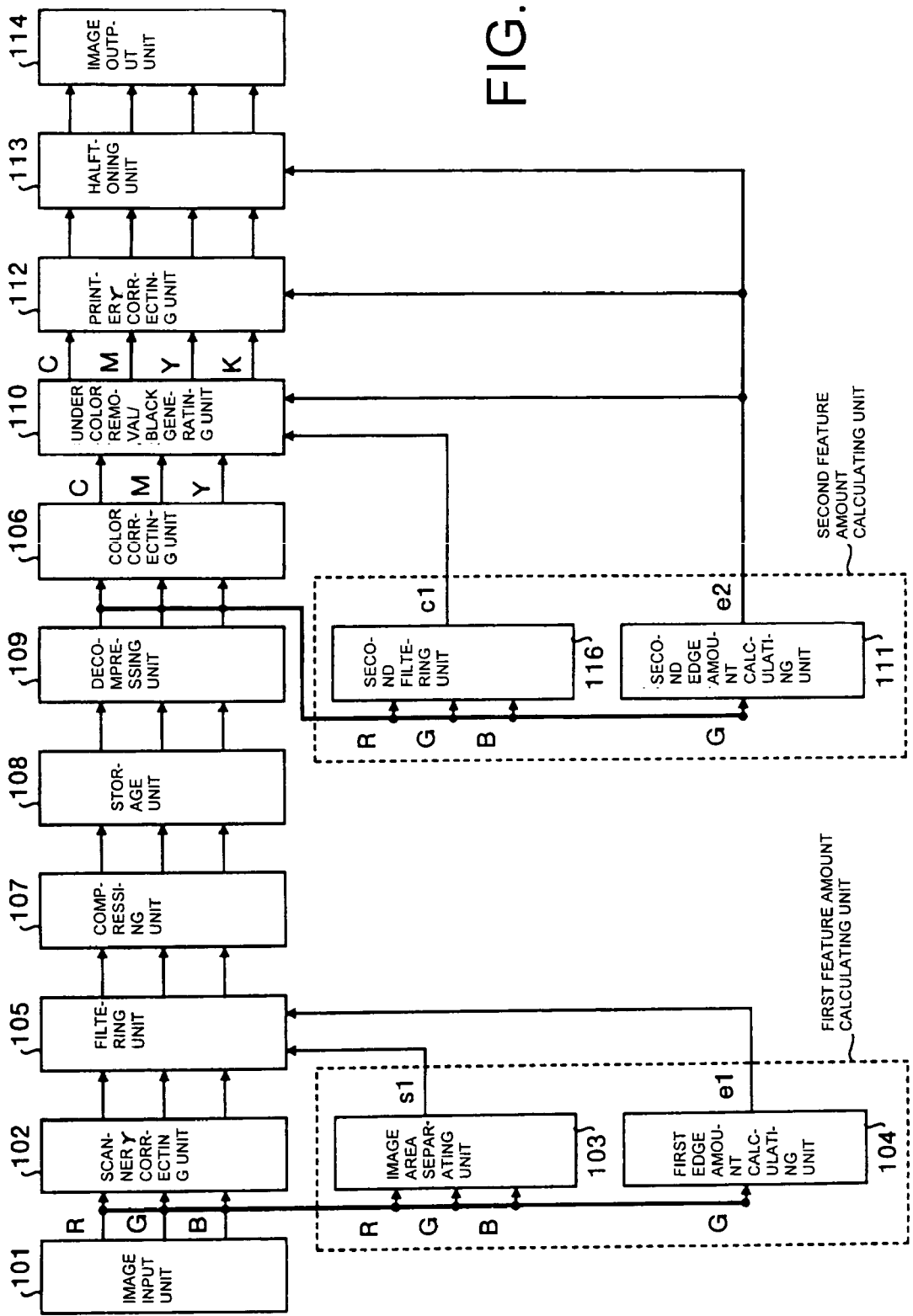
FIG. 13 is a block diagram of an image processing apparatus according to a third embodiment of the present invention.

FIG. 13 is a block diagram of the image processing apparatus according to a third embodiment of the present invention. In FIG. 13, the same reference numerals are assigned to units having the equivalent functions to those of the units in FIG. 1, and explanation thereof is omitted. The image processing apparatus shown in FIG. 13 is configured to compress image data after filtering and store the data, and further includes a color determining unit 116 based on the configuration of the first embodiment (FIG. 1). As shown in FIG. 3, the image area separating unit 103 and the first edge amount calculating unit 104 form the first feature amount calculating unit, and the second edge amount calculating unit 111 and the color determining unit 116 form the second feature amount calculating unit.

A compressing unit 107 subjects RGB signals after the filtering input from the filtering unit 105 to irreversible compression processing and stores the signals in a storage unit 108.

A decompressing unit 109 decompresses the RGB signals compressed and stored in the storage unit 108, outputs the decompressed RGB signals to the color correcting unit 106 and the color determining unit 116, and also outputs the G signal to the second edge amount calculating unit 111.

The color determining unit 116 generates a continuous (multilevel) color determination signal c1 indicating an achromatic level of the RGB signals input from the decompressing unit 109 by units of pixel (or units of block), and outputs the signal to an undercolor removal/black generating unit 110. The second edge amount calculating unit 111 has the same configuration as that of the first edge amount calculating unit 104 of the first embodiment. The second edge amount calculating unit 111 subjects the G signal input from the decompressing unit 109 to filtering and generates a multilevel edge amount e2, and outputs the amount to the undercolor removal/black generating unit 110, printer γ correcting unit 112, and the halftoning unit 113.

The undercolor removal/black generating unit 110 adaptively suppresses the color components of the CMY signals input from the color correcting unit 106 to generate a K signal as the black component based on the continuous (multilevel) color determination signal c1 and the continuous (multilevel) edge amount e2, and outputs the CMYK signals to the printer γ correcting unit 112.

The method of controlling generation of black according to the edge determination result and the result of determining an achromatic component includes a method disclosed, for example, in Japanese Patent No. 2677283. If suppressing the color component is performed on the image signal having been irreversibly compressed and decompressed like in this embodiment, then it is desirable that the result of edge determination has a multilevel. This is because if an edge area is detected from the image signal that is degraded due to compression and decompression, there may be a case where a comparatively large edge amount is detected in an area where an edge amount is originally less, caused by distortion of the image signal. As explained above, when the generation of black is controlled to the signal after the irreversible compression and decompression are performed according to the result of edge detection and the result of determination of the achromatic component, a continuous (multilevel) feature amount needs to be used.

Figure 14:
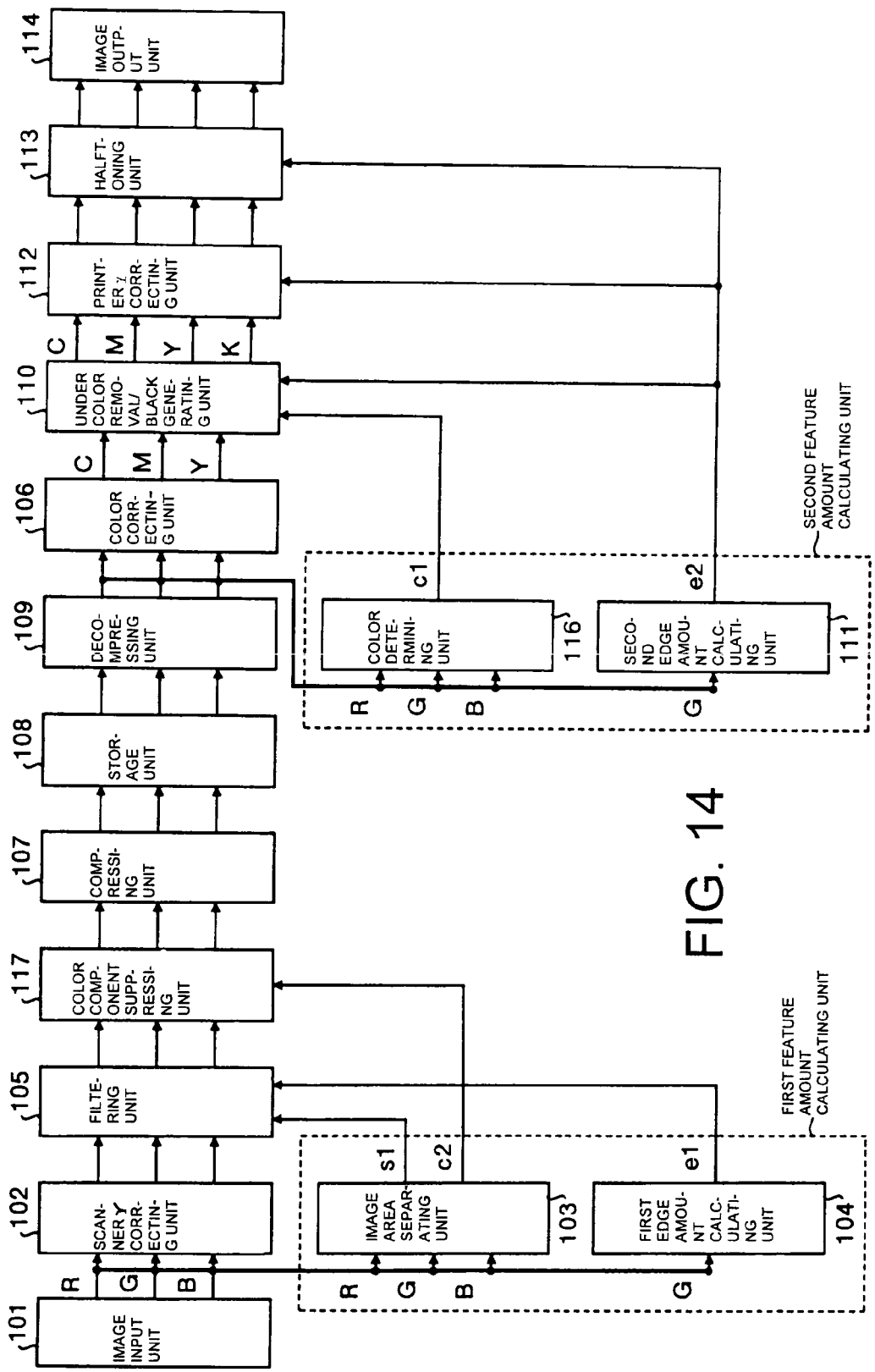
FIG. 14 is a block diagram of an image processing apparatus according to a fourth embodiment of the present invention.

FIG. 14 is a block diagram of the image processing apparatus according to a fourth embodiment of the present invention. In FIG. 14, the same reference numerals are assigned to units having the equivalent functions to those of the units in FIG. 13, and explanation thereof is omitted. The image processing apparatus shown in FIG. 14 has a color component suppressing unit 117 between the filtering unit 105 and the compressing unit 107 based on the configuration of the third embodiment (FIG. 13) so that the color component suppressing unit 117 suppresses a color component based on a color determination signal c2 input from the image area separating unit 103. As shown in FIG. 14, the image area separating unit 103 and the first edge amount calculating unit 104 form the first feature amount calculating unit, and the second edge amount calculating unit 111 and the color determining unit 116 form the second feature amount calculating unit.

The image area separating unit 103 further includes a color determining unit (not shown), and generates the color determination signal c2 indicating whether the RGB signals input from the image input unit 101 is achromatic, by units of pixel (or units of block), and outputs the signal to the color component suppressing unit 117.

Figure 15:
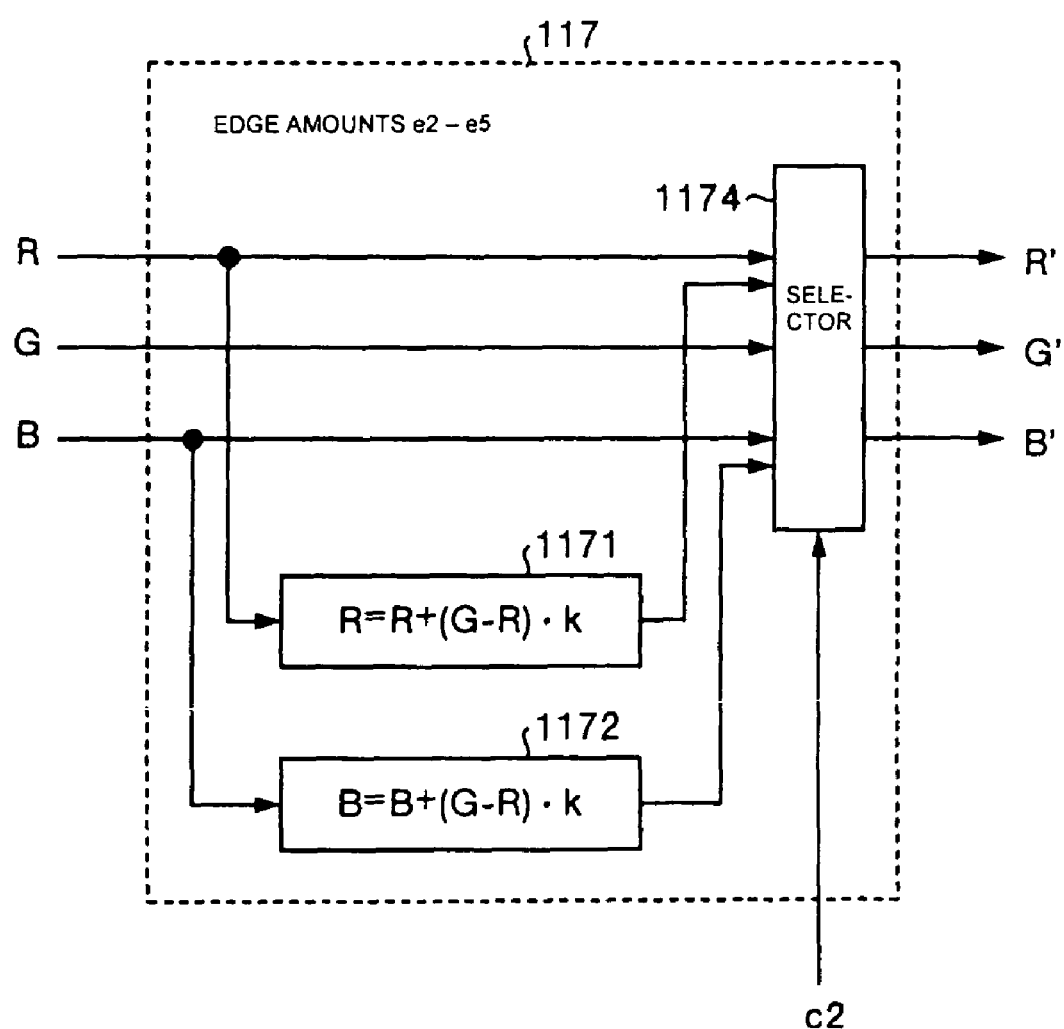
FIG. 15 illustrates the detailed configuration of a color component suppressing unit shown in FIG. 14.

FIG. 15 is a block diagram of the detailed configuration of the color component suppressing unit 117. The color component suppressing unit 117 includes an R-component suppressing unit 1171, a B-component suppressing unit 1172, and a selector 1174.

The R-component suppressing unit 1171 performs the arithmetic of R=R+(G−R)·k on the R signal, and the B-component suppressing unit 1172 performs the arithmetic of B=B+(G−B)·k on the B signal. The R signal and the B signal on which the correction (processing to achromatic color) is performed so as to be close to the G signal, and outputs the R signal and the B signal to the selector 1174, where k represents a predetermined ratio, k=0 to 1, and either of the signals closer to "1" becomes the closest one to the G signal.

The selector 1174 receives the RGB signals input from the filtering unit 105, and the R signal and B signal having been corrected so as to be closer to the G signal. The selector 1174 then selects either of the RGB signals input from the filtering unit 105 and the RGB signals (G signal has not been corrected) having been corrected (processing to the achromatic color) based on the color determination signal c2 input from the image area separating unit 103, and outputs the selected signals to the compressing unit 108. More specifically, if the color determination signal c2 indicates an achromatic color, the selector 1174 outputs the RGB signals having been corrected (processing to the achromatic color), and outputs the RGB signals input from the filtering unit 105 if the color determination signal c2 does not indicate an achromatic color.

As explained above, the color component is suppressed based on the color determination signal c2 with high precision that is obtained from the image signal without degradation because the signal is not compressed and decompressed. Therefore, the color determination in the color determining unit 116 in the rear stage can be performed with high precision with a comparatively simpler configuration.

By processing the image data to achromatic color, the compression rate in the compressing unit 107 can be improved, or the image quality can be improved if a fixed-length compression method is employed. Particularly, in a method of temporarily converting the RGB signals to signals in a luminance color difference system such as YUV and YIQ and compressing the signals, by processing the data to achromatic color, and therefore the value of the color difference signal becomes smaller, which makes it possible to improve the compression rate.

Figure 16:
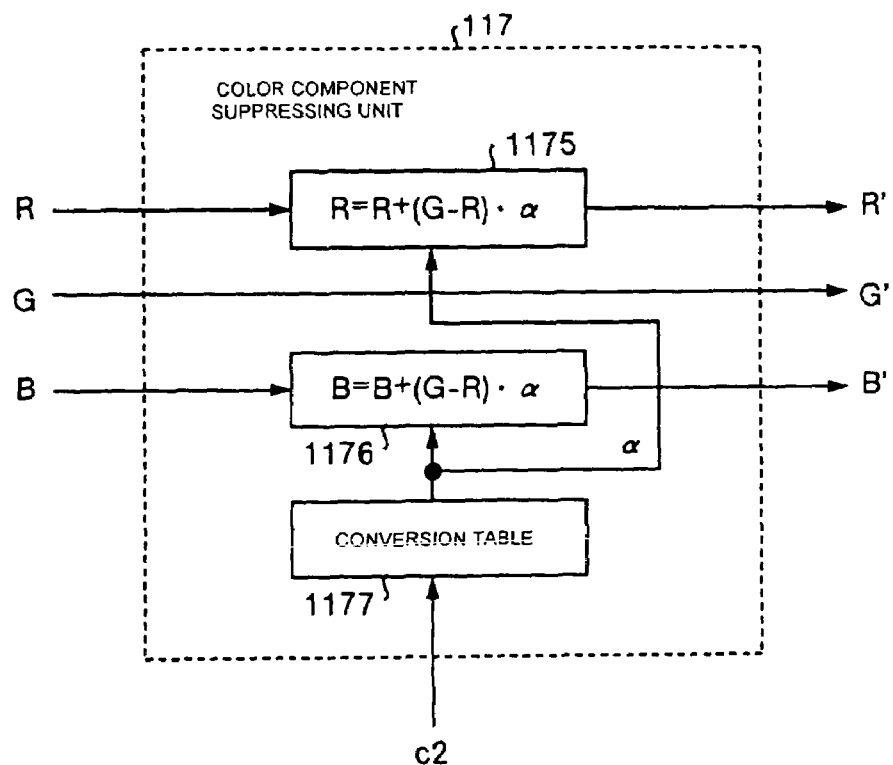
FIG. 16 illustrates another detailed configuration of the color component suppressing unit shown in FIG. 14.

FIG. 16 illustrates another example of the configuration of the color component suppressing unit 117 of FIG. 14. A color component suppressing unit 217 includes an R-component suppressing unit 1175, a B-component suppressing unit 1176, and a unit for a conversion table 1177 ("conversion table 1177").

Figure 17:
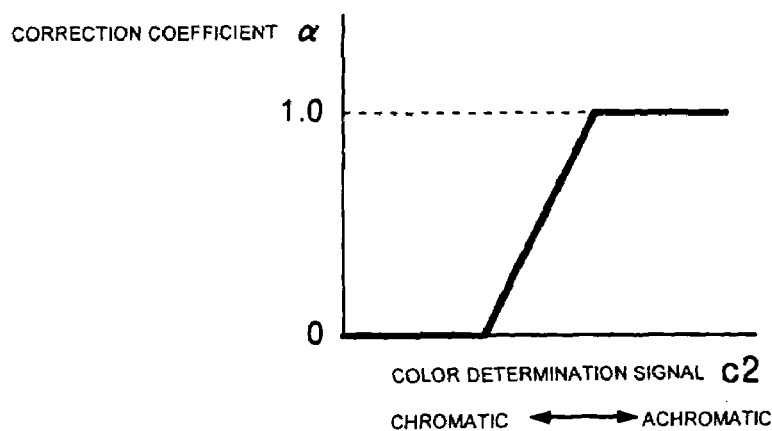
FIG. 17 illustrates output characteristics of a conversion table of FIG. 16.

The image area separating unit 103 outputs a continuous (multilevel) color determination signal c2 indicating a level of achromatic color to the color component suppressing unit 217. The conversion table 1177 receives the color determination signal c2 from the image area separating unit 103, calculates a correction coefficient α according to the color determination signal c2, and outputs the calculated value to the R-component suppressing unit 1175 and the B-component suppressing unit 1176. FIG. 17 illustrates output characteristics of the conversion table 1177. The conversion table 1177 is configured so that if the value of the color determination signal c2 indicating the level of the achromatic color is larger, then the correction coefficient α (0 to 1) is a large value closer to 1.

The R-component suppressing unit 1175 performs an arithmetic of R=R+(G−R)·α on the R signal, and the B-component suppressing unit 1176 performs an arithmetic of B=B+(G−B)·α on the B signal. The obtained values are output to the compressing unit 107, respectively. Thus, it is possible to process the signal close to the achromatic color so as to be further closer to the achromatic color and output the signal.

According to the color component suppressing unit 217, the color component can be suppressed step by step, thus obtaining an image quality that seems more natural than that obtained through binary control.

In the fourth embodiment, the color component suppressing unit 117 or 217 suppresses the color component based on only the color determination signal c2. However, if such a processing is performed on the signal close to the achromatic color in a pattern such as a photographic document, color reproduction and tone may be impaired. Therefore, the apparatus may be configured such that the color component is suppressed only for the pixel determined as the character.

Figure 18:
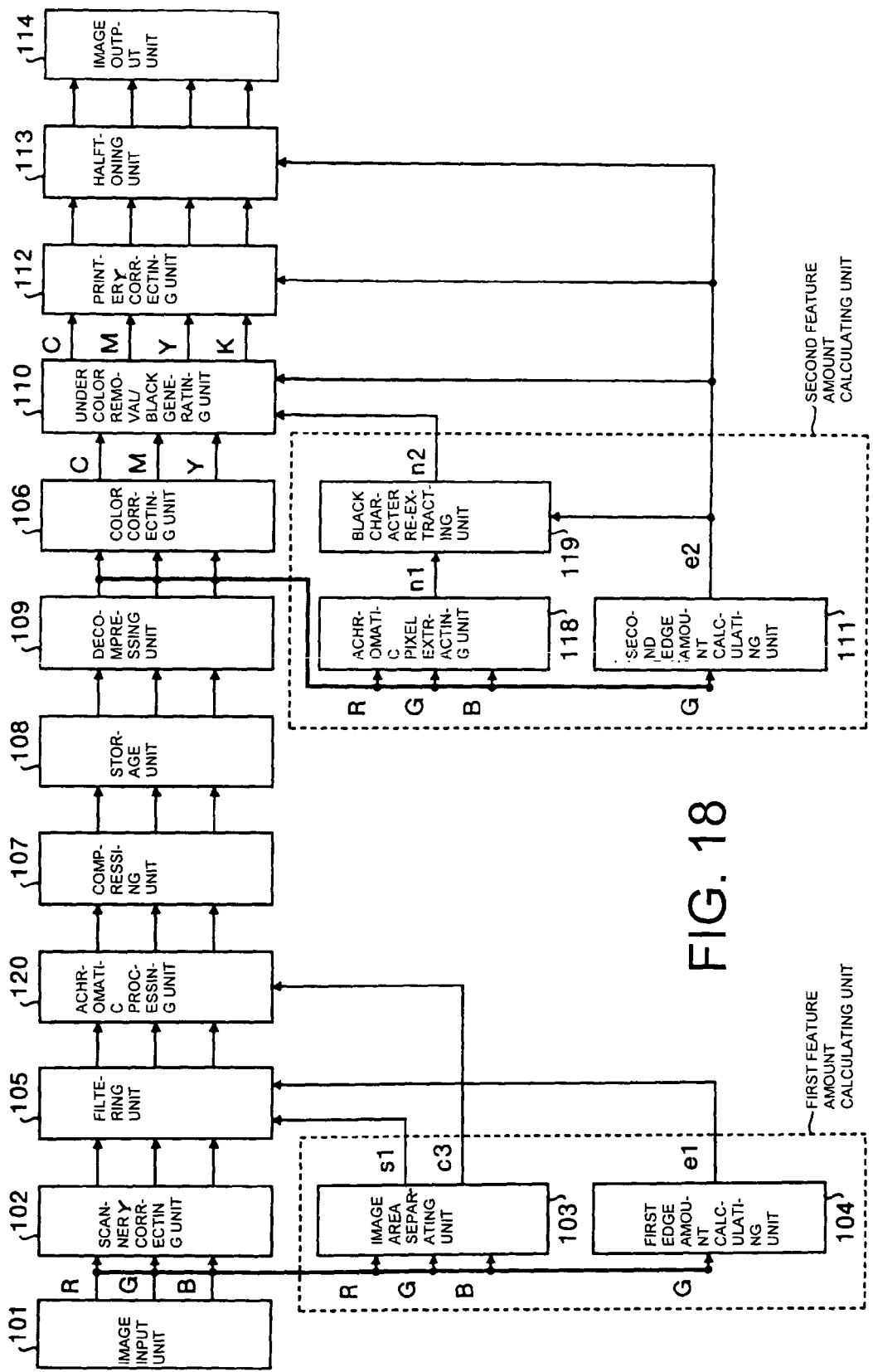
FIG. 18 is a block diagram of an image processing apparatus according to a fifth embodiment of the present invention.

FIG. 18 is a block diagram of the image processing apparatus according to a fifth embodiment of the present invention. In FIG. 18, the same reference numerals are assigned to units having the equivalent functions to those of the units in FIG. 14, and explanation thereof is omitted. The image processing apparatus shown in FIG. 18 includes an achromatic processing unit 120 provided instead of the color component suppressing unit 117 based on the image processing apparatus shown in FIG. 14. The image processing apparatus also includes an achromatic pixel extracting unit 118 and a black character re-extracting unit 119 provided instead of the color determining unit 116. As shown in FIG. 18, the image area separating unit 103 and the first edge amount calculating unit 104 form the first feature amount calculating unit. Further, the second edge amount calculating unit 111, achromatic pixel extracting unit 118, and the black character re-extracting unit 119 form the second feature amount calculating unit.

The image area separating unit 103 further includes a black character pixel determining unit (not shown). The image area separating unit 103 determines whether the RGB signals input from the image input unit 101 are signals indicating an achromatic pixel and a character pixel by units of pixel. If the signals indicate the achromatic pixel and character pixel, the image area separating unit 103 determines the signals as the black character pixel, and outputs a black character signal c3 indicating if it is the black character pixel, to the achromatic processing unit 120.

Figure 19:
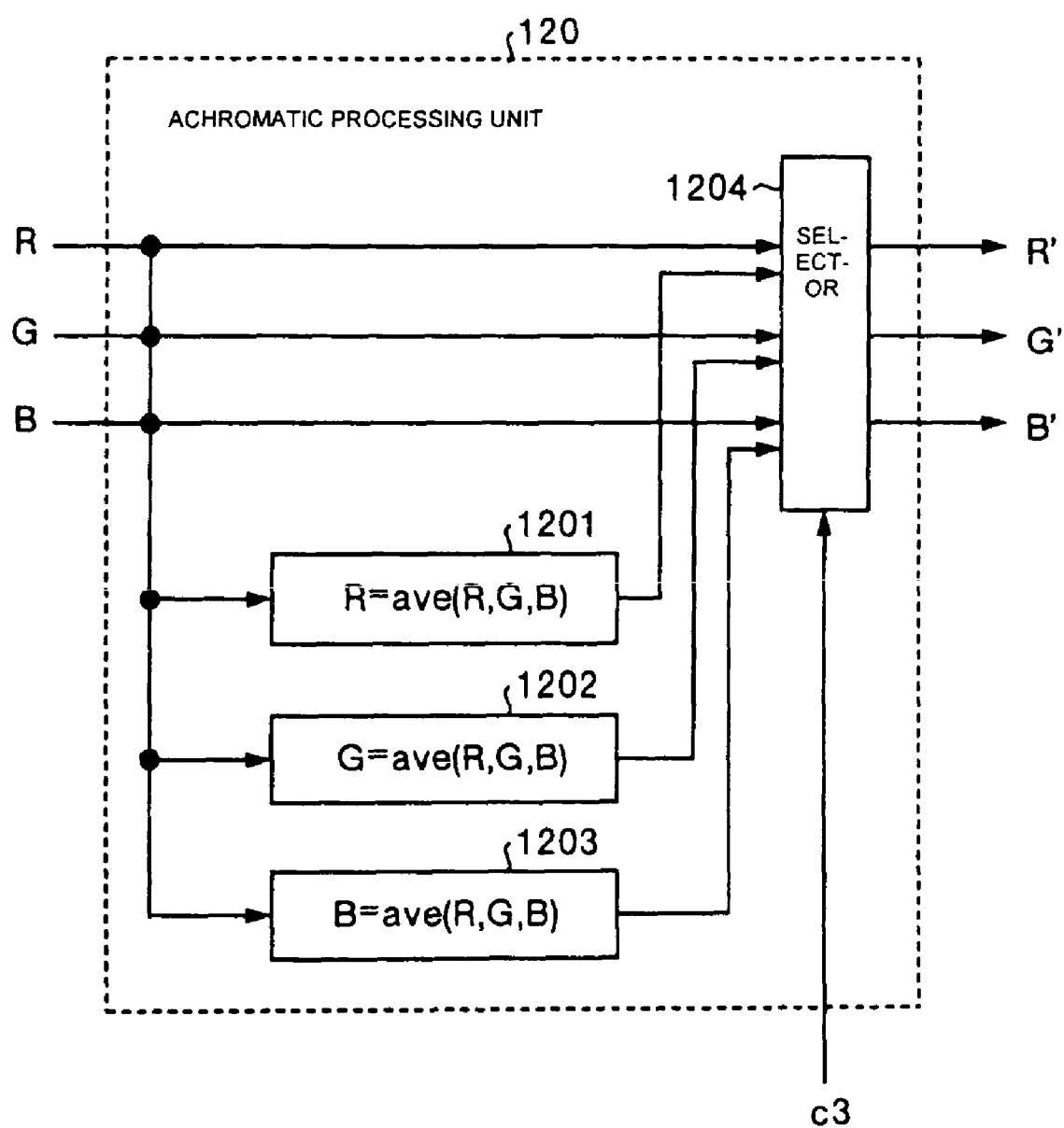
FIG. 19 illustrates the detailed configuration of an achromatic processing unit shown in FIG. 18.

The achromatic processing unit 120 subjects the RGB signals input from the filtering unit 105 to achromatic color conversion based on the black character signal c3 input from the image area separating unit 103, and outputs the signals to the compressing unit 107. FIG. 19 illustrates the detailed configuration of the achromatic processing unit 120. The achromatic processing unit includes an R averaging unit 1201, a G averaging unit 1202, a B averaging unit 1203, and a selector 1204.

The R averaging unit 1201, G averaging unit 1202, and the B averaging unit 1203 average the respective RGB signals input from the filtering unit 105 using the whole signals (R=G=B), and convert the averaged values to the RGB signals indicating the achromatic color, and output the converted signals to the selector 1204. The selector 1204 receives the RGB signals from the filtering unit 105 and the averaged RGB signals indicating the achromatic color. If the black character signal c3 input from the image area separating unit 103 indicates the black character pixel, the selector 1204 outputs the RGB signals indicating the achromatic color, and outputs the RGB signals input from the filtering unit 105 as they are if the black character signal c3 does not indicate the black character pixel.

As shown in FIG. 18, the achromatic pixel extracting unit 118 and the black character re-extracting unit 119 extract again the black character information set in the achromatic processing unit 120 from the compressed and decompressed RGB signals.

The achromatic pixel extracting unit 118 extracts whole pixels that are R=G=B as black character pixel candidates n1 from the RGB signals input from the decompressing unit 109, and outputs the extracted pixels to the black character re-extracting unit 119. Since pixels that are R=G=B exist in the pattern portion, these pixels need to be removed. Therefore, the black character re-extracting unit 119 determines an area with a large edge amount based on the continuous edge amount e2 input from the second edge amount calculating unit 111. Then, the black character re-extracting unit 119 determines the pixel that has the large edge amount and is the black character pixel candidate n1, as a black character pixel n2, and outputs the pixel n2 to the undercolor removal/black generating unit 110. Moreover, if a medium level of the edge amount e2 is detected, the black character re-extracting unit 119 determines if the pixel having the medium level is a black character according to whether peripheral pixels of the pixel include a pixel determined as a black character. If the pixel determined as the black character is included, then the pixel having the medium level is determined as the black character pixel n2.

As explained above, a final determination result of the black character is determined based on the continuous (multilevel) edge amount. Thus, it is possible to perform re-extraction of the black character that hardly undergoes the influence of the image degradation such as compression.

The undercolor removal/black generating unit 107 performs perfect achromatic processing, so-called black character processing on the black character area according to the black character information n2 input from the black character re-extracting unit 119, and adaptively suppresses color component on the area other than the black character area according to the edge amount e2. It is thereby possible to reproduce an image with high resolution.

It is explained above to perform the compression on the RGB signals, but the compression and decompression method in the fourth and fifth embodiments is desirably a method based on the signals in the luminance color difference system. In the method of converting the RGB signals once into signals in the luminance color difference system such as YUV and YIQ and compressing the signals, the signals are further processed so as to be the achromatic color to reduce the value of the color difference signal, which makes it possible to improve the Compression rate. Thus, the finally obtained image quality is high. From the viewpoint of storing capability of the black character information, such a relationship as R=G=B is prone to be broken in the compression of the RGB system, which is disadvantageous. In the case of the signals in the luminance color difference system, the black character on the blank portion has continuous signals with a color difference of zero, and therefore such a relationship as R=G=B is not broken by the compression and decompression.

As explained above, a combination of the compressing method with the compression method in the luminance color difference system allows significant improvement of the image quality in the image processing apparatus as follows. That is, the image processing apparatus irreversibly compresses a signal obtained by suppressing the color component through separation in the previous stage or burying the black character information in the image data in the form of R=G=B, stores the signal, extracts again feature amounts from the decompressed image, and performs the processing in the rear stage.

It is noted that the present invention may be applied to any system comprised of plural pieces of equipment or an apparatus comprised of a single equipment. Further, the example of the image input unit is a scanner and an image is input through the scanner, but an image may be input through an imaging unit such as a digital camera or may be supplied through a network.

The image processing apparatus of the present invention may be applied to any system comprised of plural pieces of equipment such as a host computer, an interface, a scanner, and a printer, or may be applied to a device comprised of single equipment such as a copier, digital multifunction machine, and a facsimile.

The object of the present invention can be also achieved by supplying a recording medium, where program codes of software to realize a function of the image processing apparatus are recorded, to a system or a device and allowing a computer (CPU, MPU, or DSP) of the system or the device to execute the program codes. In this case, the program codes read out from the recording medium realize the function of the image processing apparatus. Thus, the program codes or the recording medium with the program recorded thereon are included in the present invention. The recording medium includes an optical recording medium, magnetic recording medium, magneto-optical recording medium, and a semiconductor recording medium such as a floppy disk, hard disk, optical disk, magneto-optical disk, CD-ROM, CD-R, magnetic tape, nonvolatile memory, and ROM.

Further, by executing the program codes read out by the computer, the function of the image processing apparatus is realized, and the case as follows is also included in the present invention. That is, the function of the image processing apparatus is realized through processing such that an operating system on the computer performs a part of an actual processing or the whole of it based on instructions of the program codes.

Furthermore, the case as follows is also included in the present invention. That is, the function of the image processing apparatus is realized through processing such that the program codes read-out from the recording medium is written in memory of an extensions board inserted into the computer or of an extensions unit connected to the computer, and then CPU provided in the extensions board or the extensions unit performs a part of the actual processing or the whole of it.

As explained above, according to the present invention, it is advantageously possible to reproduce an image at high quality.

Moreover, it is possible to continuously control image processing based on the continuous edge amounts, and to reproduce an image at still better quality.

Furthermore, it is possible to continuously control the dithering based on the continuous edge amounts, and to reproduce an image at still better quality.

Moreover, it is possible to continuously control the error diffusion processing based on the continuous edge amounts, and to reproduce an image at still better quality.

Furthermore, it is advantageously possible to select a more appropriate dither matrix according to the edge amount.

Moreover, it is possible to continuously control the filtering based on the continuous edge amounts, and to reproduce an image at still better quality.

Furthermore, it is possible to perform achromatic processing with less defect by performing achromatic processing according to the edge amounts even if the processing is degraded caused by the compression.

Moreover, it is possible to precisely detect color determination in the rear stage by suppressing the color component based on the color determination result in the previous stage, and to reduce degradation of image quality due to the irreversible compression.

Moreover, it is possible to prevent impairment of the tone and color reproduction without suppression of pixels in a pattern such as a photographic document by suppressing the color component only of a black character.

Furthermore, it is possible to detect the black character from the compressed color image signal with a simple configuration by burying the black character information in the color image signal.

Moreover, it is possible to improve a compression rate of the signal indicating a further achromatic level by converting the image signal into the signal in the luminance color difference system and compressing the converted signal.

Furthermore, it is advantageously possible to suppress a defect (poor image) due to coexistence of different area determination results.

The present document incorporates by reference the entire contents of Japanese priority document, 2002-274837 filed in Japan on Sep. 20, 2002.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image processing apparatus, comprising:
   a first calculating unit configured to calculate a first feature amount from a color image signal;
   a first processing unit configured to process the color image signal based on the first feature amount to generate a processed signal;
   a compressing unit configured to compress the processed signal to generate a compressed signal;
   a storage unit configured to store the compressed signal;
   a decompressing unit configured to decompress the compressed signal to generate a decompressed signal;
   a second calculating unit configured to calculate a second feature amount from the decompressed signal, wherein the second feature amount being multinary; and
   a second processing unit configured to process the decompressed signal based on the second feature amount.

2. The image processing unit according to claim 1, wherein the second calculating unit is configured to calculate an edge amount from the compressed signal as the second feature amount.

3. The image processing unit according to claim 2, wherein the second processing unit subjects the decompressed signal to dithering in which a dither threshold is continuously changed based on the second feature amount.

4. The image processing unit according to claim 2, wherein the second processing unit is configured to process the decompressed signal based on an error diffusion method that includes expressing quantized thresholds of the decompressed signal as a threshold matrix of a dither pattern, and determining the threshold matrix of the dither pattern based on the second feature amount.

5. The image processing unit according to claim 4, wherein the second processing unit is configured to employ a threshold matrix of a dither pattern such that an amplitude of the dither pattern increases as the second feature amount increases.

6. The image processing unit according to claim 2, wherein the second processing unit is configured to subject the decompressed signal to adaptive filter processing in which correction of spatial frequency characteristic is continuously changed based on the second feature amount.

7. The image processing unit according to claim 1, wherein the second calculating unit includes
   an edge amount calculating unit configured to calculate an edge amount that is multinary from the compressed signal as the second feature amount; and
   a color calculating unit configured to calculate a level of achromatic color in the compressed signal as the second feature amount, wherein
   the second processing unit is configured to suppress a color component of the decompressed signal based on the edge amount and the level of achromatic color.

8. The image processing unit according to claim 1, wherein
   the first calculating unit is configured to calculate a level of achromatic color in the color image signal as the first feature amount, and
   the first processing unit is configured to suppress a color component of the color image signal based on the first feature signal.

9. The image processing unit according to claim 1, wherein the first calculating unit includes
   a color calculating unit configured to calculate a level of achromatic color in the color image signal as the first feature amount; and
   a character determining unit configured to determine presence or absence of a character in the color image signal as the first feature amount, and
   the first processing unit is configured to suppress a color component of the color image signal based on the level of achromatic color and the determination regarding the presence or absence of a character.

10. The image processing unit according to claim 2, wherein the first calculating unit is configured to determine presence or absence of a black character in the color image signal as the first feature amount, the first processing unit is configured to determine a signal value indicating an achromatic color for the color image signal based on the determination regarding the presence or absence of a black character, and the second processing unit is configured to suppress a color component of the decompressed signal based on the second feature amount and the signal value.

11. The image processing unit according to claim 8, wherein the compressing unit is configured to compress the processed signal after converting the processed signal into a signal in a luminance color difference system.

12. The image processing unit according to claim 9, wherein the compressing unit is configured to compress the processed signal after converting the processed signal into a signal in a luminance color difference system.

13. The image processing unit according to claim 10, wherein the compressing unit is configured to compress the processed signal after converting the processed signal into a signal in a luminance color difference system.

14. An image processing method, comprising:

calculating a first feature amount from a color image signal;

processing the color image signal based on the first feature amount to generate a processed signal;

compressing the processed signal to generate a compressed signal;

decompressing the compressed signal to generate a decompressed signal;

calculating a second feature amount that is multinary from the decompressed signal; and processing the decompressed signal based on the second feature amount.

15. A computer readable medium, storing computer executable instructions that cause a computer to implement a method of:

calculating a first feature amount from a color image signal;

processing the color image signal based on the first feature amount to generate a processed signal;

compressing the processed signal to generate a compressed signal;

decompressing the compressed signal to generate a decompressed signal;

calculating a second feature amount that is multinary from the decompressed signal; and processing the decompressed signal based on the second feature amount.

* * * * *